US010901729B2

(12) United States Patent
Singh et al.

(10) Patent No.: US 10,901,729 B2
(45) Date of Patent: Jan. 26, 2021

(54) SYSTEM AND METHOD FOR MERGING SPECIFICATION FILES FOR AN APPLICATION PROGRAMMING INTERFACE

(71) Applicants: Richa Singh, Bellevue, WA (US); Elsi Godolja, Bellevue, WA (US); Anurag Gupta, Bellevue, WA (US); Sebastian Amara, Bellevue, WA (US)

(72) Inventors: Richa Singh, Bellevue, WA (US); Elsi Godolja, Bellevue, WA (US); Anurag Gupta, Bellevue, WA (US); Sebastian Amara, Bellevue, WA (US)

(73) Assignee: VISA INTERNATIONAL SERVICE ASSOCIATION, San Francisco, CA (US)

(*) Notice: Subject to any disclaimer, the term of this patent is extended or adjusted under 35 U.S.C. 154(b) by 12 days.

(21) Appl. No.: 16/359,702

(22) Filed: Mar. 20, 2019

(65) Prior Publication Data
US 2020/0301702 A1 Sep. 24, 2020

(51) Int. Cl.
*G06F 8/73* (2018.01)
*G06F 8/10* (2018.01)

(52) U.S. Cl.
CPC .... *G06F 8/73* (2013.01); *G06F 8/10* (2013.01)

(58) Field of Classification Search
CPC .................................... G06F 8/10; G06F 8/73
USPC ........................................................ 717/123
See application file for complete search history.

(56) References Cited

U.S. PATENT DOCUMENTS

| | | | | |
|---|---|---|---|---|
| 6,366,876 | B1* | 4/2002 | Looney | G06F 8/10 703/25 |
| 9,483,260 | B1* | 11/2016 | Hale | G06F 8/73 |
| 2003/0167455 | A1* | 9/2003 | Iborra | G06F 8/30 717/105 |
| 2004/0061719 | A1* | 4/2004 | Barsness | G06F 8/73 715/760 |
| 2006/0288352 | A1* | 12/2006 | Lucas | G06F 8/73 719/328 |
| 2009/0138524 | A1* | 5/2009 | Singh | G06F 9/453 |
| 2013/0086553 | A1* | 4/2013 | Grechanik | G06F 8/70 717/123 |
| 2017/0102925 | A1* | 4/2017 | Ali | G06F 8/30 |
| 2019/0004873 | A1* | 1/2019 | Liu | G06F 9/541 |
| 2019/0034199 | A1* | 1/2019 | Pollock | G06F 8/73 |

(Continued)

OTHER PUBLICATIONS

Ros, Irene, "REST API Documentation Best Practices," Bocoup, Aug. 22, 2012, last retrieved from https://bocoup.com/blog/documenting-your-api on May 25, 2020. (Year: 2012).*

*Primary Examiner* — Andrew M. Lyons
(74) *Attorney, Agent, or Firm* — Loeb & Loeb LLP

(57) ABSTRACT

Several API specification files that each include references to code elements that are defined within separate definitions and resources files may be merged together into a single specification for the new API. In this way, specifications for shared code elements that are common across the several specification files may be created without rewriting these specifications each time they are used in an API. A specification merging tool may look for a common reference in the API, match that reference to a definition or resource from the respective definition or resource document, and add that definition or resource to a merged specification file.

18 Claims, 6 Drawing Sheets

(56) References Cited

U.S. PATENT DOCUMENTS

2019/0138376 A1*  5/2019  Christy Jesuraj ......... G06F 9/54
2019/0325074 A1* 10/2019  Ghezzi ...................... G06F 8/36
2019/0384856 A1* 12/2019  Liu ..................... G06F 16/3334

* cited by examiner

300

"$ref": "./customers.json#/definitions/CreateCustomer"
 \_╥_/  _____╥_____/
  302                  304

"$ref": "./customers.json#/resources/CreateCustomer"
 \_╥_/  _____╥_____/
  302                 328

"$ref": "ExternalAPI/definitions/payments.json"
  302            404

"$ref": "ExternalAPI/resources/payments.json"
  302            429

FIG. 4B

SYSTEM AND METHOD FOR MERGING SPECIFICATION FILES FOR AN APPLICATION PROGRAMMING INTERFACE

BACKGROUND

Accurate documentation in software design is crucial for the long-term viability of an application programming interface (API). Documentation essentially forms a reference manual for the API and is meant for developers to read and understand. Without proper documentation, developers may struggle to fully understand the code and its dependencies which will degrade the developer experience (DX). The better the DX, the greater chances are that the API itself will succeed as it will be easier to incorporate into existing user interfaces. Good documentation will also decrease the amount of time to bring new users to the API as well as limit the use of scarce resources such as customer service or other direct support to make up for poor documentation.

While there are many tools available to generate and maintain API documentation, past efforts have failed to merge existing API specifications. For example, previous solutions could only resolve references defined within a single specification, not across multiple specifications.

SUMMARY

The following presents a simplified summary of the present disclosure in order to provide a basic understanding of some aspects of the disclosure. This summary is not an extensive overview. It is not intended to identify key or critical elements of the disclosure or to delineate its scope. The following summary merely presents some concepts in a simplified form as a prelude to the more detailed description provided below.

The disclosure presents practical applications to software design and API documentation and maintenance by employing a common set of specification resources and definitions for API code elements that are used across multiple APIs and then merged into a single specification for each API that includes a shared code element. Several API specification files that each include references to code elements that are defined within separate definitions and resources files may be merged together into a single specification for the new API. In this way, specifications for shared code elements that are common across the several specification files may be created without rewriting these specifications each time they are used in an API. A specification merging tool may look for a common reference (e.g., an "$ref" property) in the API, match that reference to a definition or resource from the respective definition or resource document, and add that definition or resource to a merged specification file. The resulting merged specification file may then be validated.

In some embodiments, a processor-implemented method may create a merged specification file for a software application. The method may receive a plurality of application programming interface (API) specifications. Each API specification may include one or more resources and definitions. The method may then identify each API specification as either an API resource or an API definition and receive a code file corresponding to the software application. The code file may include references to at least one of the one or more resources and definitions. After initializing a specification document for the software application, the method may resolve the references to the corresponding one or more resources and definitions of the API specifications and add the corresponding one or more resources and definitions of the API specifications to the specification document.

In further embodiments, a system may also create a merged specification file for a software application. The system may comprise a processor and memory hosting an application development system, and a database coupled to the processor and the memory. The database may store a plurality of application programming interface (API) specifications, each API specification including one or more resources and definitions, and a code file corresponding to the software application, the code file including references to at least one of the one or more resources and definitions. The memory may include instructions that are executable by the processor. For example, the memory may include instructions for identifying each API specification as either an API resource or an API definition, and initializing a specification document for the software application. Further instructions may resolve the references to the corresponding one or more resources and definitions of the API specifications, and add the corresponding one or more resources and definitions of the API specifications to the specification document.

BRIEF DESCRIPTION OF THE FIGURES

The invention may be better understood by references to the detailed description when considered in connection with the accompanying drawings. The components in the figures are not necessarily to scale, emphasis instead being placed upon illustrating the principles of the invention. In the figures, like reference numerals designate corresponding parts throughout the different views.

FIG. 3A shows an exemplary reference for a definition that may reside in the same domain as the API;

FIG. 3B shows an exemplary reference for a resource that may reside in the same domain as the API;

FIG. 4A shows an exemplary reference for a definition that may reside in a different domain as the API;

FIG. 4B shows an exemplary reference for a resource that may reside in a different domain as the API;

Persons of ordinary skill in the art will appreciate that elements in the figures are illustrated for simplicity and clarity so not all connections and options have been shown to avoid obscuring the inventive aspects. For example, common but well-understood elements that are useful or necessary in a commercially feasible embodiment are not often depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions used herein are to be defined with respect to their corresponding respective areas of inquiry and study except where specific meanings have otherwise been set forth herein.

DETAILED DESCRIPTION

The present invention now will be described more fully with reference to the accompanying drawings, which form a part hereof, and which show, by way of illustration, specific exemplary embodiments by which the invention may be practiced. These illustrations and exemplary embodiments are presented with the understanding that the present disclosure is an exemplification of the principles of one or more inventions and is not intended to limit any one of the inventions to the embodiments illustrated. The invention may be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods, systems, computer readable media, apparatuses, components, or devices. Accordingly, the present invention may take the form of an entirely hardware embodiment, an entirely software embodiment, or an embodiment combining software and hardware aspects. The following detailed description is, therefore, not to be taken in a limiting sense.

Figure 1:
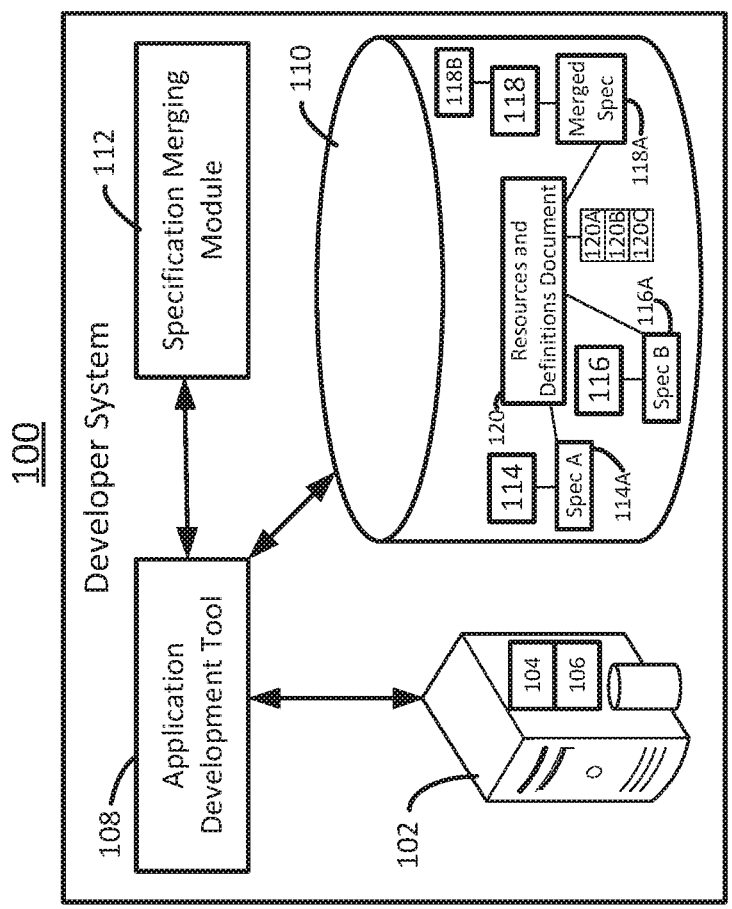
FIG. 1 shows an illustration of an exemplary system for creating a merged API specification document.

FIG. 1 generally illustrates one embodiment of an application development system 100 for creating and managing software code. In some embodiments, the system 100 includes a developer computer system 102 having a processor 104 for executing processor-executable instructions of various modules that are stored in processor-readable memories of the system 100, such as memory 106. One module may include an application development tool 108. The application development tool 108 may include an integrated development environment (IDE), software framework, or other set of processor-executable instructions for execution on the developer computer system 102 that provide features to computer programmers for software development. Some features of the tool 108 may include a source code editor, build automation tools, a debugger, and a compiler or interpreter (or both). The tool 108 may also include modules that provide generic functionality that a developer can selectively change by additional developer-written code to build application-specific software. The tool 108 may be communicatively coupled to a code repository 110 and a specification merging module 112. The code repository 110 may include code segments 114, 116, 118 or a set of subroutine definitions, communication protocols, and tools for building software using the tool 108 such as an application programming interface (API). Each code segment or API 114, 116, 118 may include a specification document 114A, 116A, 118A. In some embodiments, a specification document (e.g., merged specification document 118A) may be a merged combination of two or more other specification documents (e.g., 114A, 116A) where a code segment or API 118 corresponding to the specification merged specification document 118A includes modules, subroutines, classes, methods, etc., that are common to other code segments (e.g., code segment 114 or 116). Each of the specification documents 114A, 116A, 118A may also be a combination of two or more documents that may be identified as resources or definitions, as described herein.

In some embodiments, the module 112 may access a common resources and definitions document 120 that includes one or more common definitions or resources 120A, 120B, 120C for common code elements. For example, ErrorResponse is a common definition defined in common.json file. ErrorResponse may be used in code segments or APIs 114, 116, and 118. The common resources and definitions document 120 may include a common definition for ErrorResponse and the specification documents 114A, 116A, and 118A may include a reference to this common definition or resource (e.g., 120A, 120B, 120C). In some embodiments, the common definition or resource 120A may be referenced using a property in a code file 118B for the API 118 that one or more processor-executable instructions of the specification merging module 112 may use as a signal to cause the processor 104 to execute a further instruction to resolve the referenced property to a common definition or resource 120A, 120B, 120C, and add the common definition or resource to a specification document (i.e., ErrorResponse from the common.json file) to the merged specification document 118A. In some embodiments, the property in the code file 118B for the API 118 may include:

"ref$": "./common.json#/definitions/ErrorResponse"

Of course, the code segments or APIs 114, 116, 118 may include any number of properties that may be resolved by processor-executable instructions of the specification merging module 112 using the common resources and definition document 120.

The specification merging module 112 may also include instructions to validate the merged specification document 118A. In some embodiments, the module 112 may use an open source specification validator such as the Swagger Spec Validator or other validation tools offered on GitHub that may validate the merged specification document 118A against a known specification (e.g., the Swagger 2.0 specification).

Figure 2:
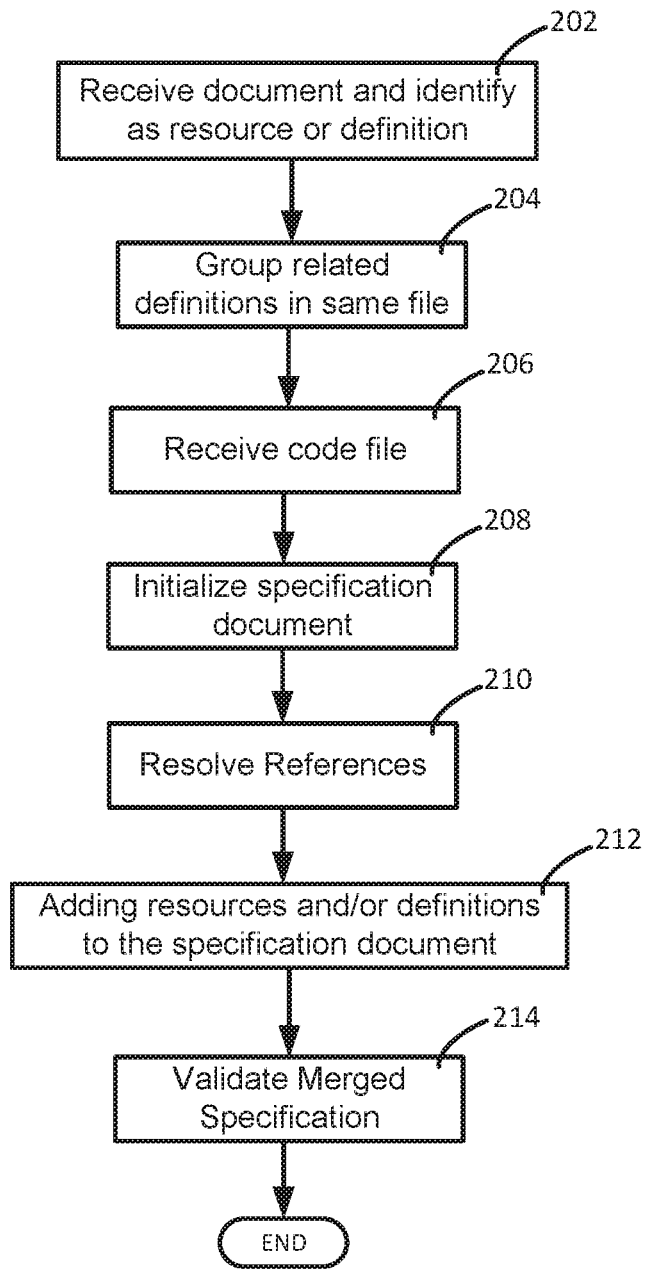
FIG. 2 shows a flowchart of a method for creating a merged API specification document.

FIG. 2 is a flowchart of a method 200 for creating a merged specification document 118A employing the system 100 of FIG. 1. Each step of the method 200 is one or more computer-executable instructions performed on a processor (e.g., 104) of a server or other computing device (e.g., developer computer system 102 or other computer system) which may be physically configured to execute the different aspects of the method. Each step may include execution of any of the instructions as described in relation to the system 100 as part of the application development tool 108, the specification merging module 112, or other component that is internal or external to the system 100. While the below blocks are presented as an ordered set, the various steps described may be executed in any particular order to complete the real-time optimal pricing methods described herein.

At block 202, the method 200 may execute instructions for receiving one or more specification documents (e.g., 114A, 116A) and identify each document as either a resource or a definition. For example, the method 200 may parse a document 114A, 116A to identify a resource as an object that can be represented as data and includes at least one uniform resource identifier (URI), i.e., a sequence of characters that identifies a logical or physical resource. The method 200 may use a tag, file extension, or other element within the specification document 114A, 116A to identify a resource. A resource name may include a script name such as "customers.json." The method 200 may also identify the document (114A, 116A) as a definition. A definition may be a logical entity that can exist individually and provides information about how the API functions, how it links to other APIs, and expected results in a machine-readable format. In further embodiments, the specification documents 114A, 116A may be identified by the programmer as either a resource or a definition. Block 202 may also include an instruction to, upon execution by the processor 104, initialize and store the specification documents 114A, 116A in either an internal-facing directory (e.g., "source/InternalAPI") or an external-facing directory (e.g., "source/ExternalAPI"), depending on identification of a file type and/or choice of the programmer.

At block 204, the method 200 may execute instructions for grouping all related definitions that were identified at block 202 into a common resources and definitions document 120. For example, the logical entity "Address" would have related definitions BaseAddress, AddressLinks, AddressList, etc., within the same common resources and definitions document 120.

At block 206, the method 200 may execute instructions to receive the code file 118B or other code corresponding to a software application. The code file 118B may include references to the one or more resources and definitions of the software application to the corresponding one or more resources and definitions of the API specifications;

At block 208, the method 200 may execute instructions for initializing a specification document that is a shell for a merged specification document 118A corresponding to the API 118. In some embodiments, the specification document (which becomes the merged specification document 118A, as described herein) may be created in a public facing/external source directory for the API 118 (e.g., "source/ExternalAPI") or in non-public/internal source directory for the API 118 (e.g., "source/InternalAPI").

At block 210, the method may execute instructions for resolving the referenced property to a corresponding common definition or resource 120A, 120B, 120C, and, at block 212, adding the referenced common definition or resource (i.e., ErrorResponse from the common.json file) to the initialized specification document (i.e., the merged specification document 118A). With brief reference to FIG. 3A, an internal definitions reference 300 may include a reference portion 302 and an internal definitions pointer portion 304 to specify the target file or part of a file within an internal source directory to reference for the resulting merged specification document 118A. For an internal definitions reference 300 referring to a local document, the internal pointer portion 304 must include the file name for the merged specification document 118A. For example, an internal definitions reference 300 for the merged specification document 118A for the file "newSpec.json" would include the file title in the internal definitions pointer portion 304 of the internal definitions reference 300:

"$ref": "./newSpec.json#/definitions/NewSpecModel"

for definitions related to the file "newSpec.json." With reference to FIG. 3B, an internal resources reference 325 for the merged specification document 118A for resources of the file "newSpec.json" would also include the reference portion 302 and an internal resources pointer portion 328 of the internal resources reference 325:

"$ref": "./newSpec.json#/resources/NewSpecModel"

With reference to FIG. 4A, an external definitions reference 400 for an API may include the reference portion 302 and an external definitions pointer portion 404 to specify the target path or part of a file within an external source directory to reference for the resulting merged specification document 118A. Likewise, with reference to FIG. 4B, an external resources reference 425 for an API may include the reference portion 302 and an external resources pointer portion 429 to specify the target path or part of a file within an external source directory to reference for the resulting merged specification document 118A.

Returning to FIG. 2, at block 212, adding the referenced resources and/or definitions to the initialized specification document creates the merged specification document 118A. In some embodiments, the method 200 may replace one or more internal definitions references 300, internal resources references 325, external definitions references 400, and external resources references 425 with definitions or resources 120A, 120B, 120C from the common resources and definitions document 120 to create the merged specification document 118A. The method 200 may also specify a merge tool path, a resource specification location, external and internal resources locations, external and internal definitions locations, as well as a location for the merged specification document 118A. For example, the command to initiate the merge process of block 210 may include the command "$ python merge.py -h" with a usage of: "merge.py [-h](-a|-s NAME [NAME . . . ])[-o [OUTFILE])". Several optional arguments may also be used with the merge command. For example, the command may include:

```
-h, --help      to show this help message and exit
-a, --all       to merge all the specs inside a source directory
-s NAME [NAME...], --specific NAME [NAME ...] to indicate the specific
specification documents to merge (no path of .json needed)
    -o [OUTFILE], --outfile [OUTFILE] to indicate a name forthe output file in
an output directory (no .json needed)
    -d [SOURCEDIRECTORY], --sourcedirectory[SOURCEDIRECTORY] to
indicate a name for an input directory where the common resources and definitions
document 120 is located.
```

In some embodiments, a command to merge all specification documents within a source directory may include:

python merge.py -all

In other embodiments, a command to merge particular specification documents within a source directory may include:

python merge.py -specific <filename1><filename2> . . .

Dependencies for the various blocks and commands indicated in the method 200 above may include an open-source programming environment such as Python or similar programming languages and an API programming environment such as Swagger and the Swagger Spec Validator tool.

At block 214, the method 200 may validate the merged specification document 118A. In some embodiments, the method may validate the merged specification document using the open source Swagger Spec Validator tool against the Swagger 2.0 specification.

Figure 5:
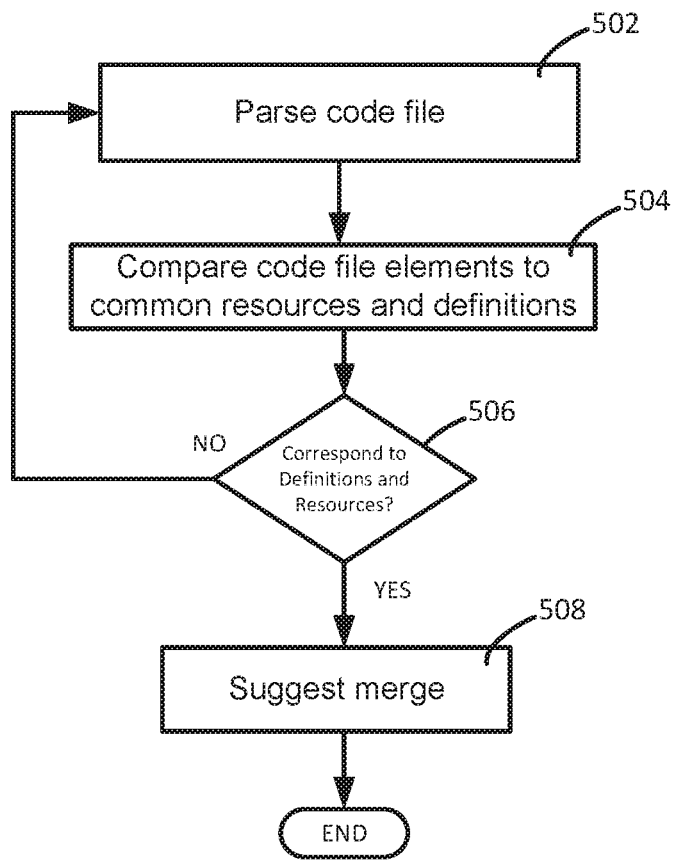
FIG. 5 shows an exemplary method for determining when a code file for an API suggests merging the common resources and definitions into a single, merged specification document.

With reference to FIG. 5, a further method 500 may automatically recognize code elements within the API 118 and cause the system to suggest creating a merged specification document 118A. For example, block 502 may parse the code file 118B and block 504 may compare various code elements within the code file 118B to the one or more different common definition or resource documents 120A, 120B, and 120C. At block 506, the method 200 may determine that the code file 118B includes elements that correspond to definitions and resources that are present in multiple different files. If elements are found, then the method may proceed to block 508. If not, the method 500 may return to block 502. At block 508, in response to determining elements are present in the code file 1186, the processor may execute further instructions to suggest merging the various definitions and resources into a single, merged specification document 118A for the API 118. In some embodiments, block 508 includes opening a dialog within the system 100 that suggests merging the definitions and resources that are identified within the code file 118B from the other specification documents 120A, 120B, 120C into the merged specification document 118A. In other embodiments, block 508 includes creating an API inventory document 118C for the API. The API inventory document 118C may include indications of which other APIs are used within the API 118. In still other embodiments, block 508 may suggest the merge action only if the number of APIs indicated within the code file 1186 are above a threshold number. The threshold number may include a value that above which would cause undue burden on future developers of the API 118 if the indicated resources and definitions were not commonly maintained. After suggesting the merge, the method 500 may end.

Thus, the present disclosure provides a technical solution to the technical problem of merging specification elements such as resources and definitions for re-used computer software code for an API into a single specification document for the API and to combine existing complete API specification documents that may reference each other into a single specification document. Multiple specification documents that include resources and definitions may be merged into a single document that presents uniform documentation for APIs that share common software code elements without being forced to individually update each document for a new API that includes the shared elements. The disclosure improves API documentation by ensuring that common API code elements are documented consistently across all APIs that share the code elements.

Figure 6:
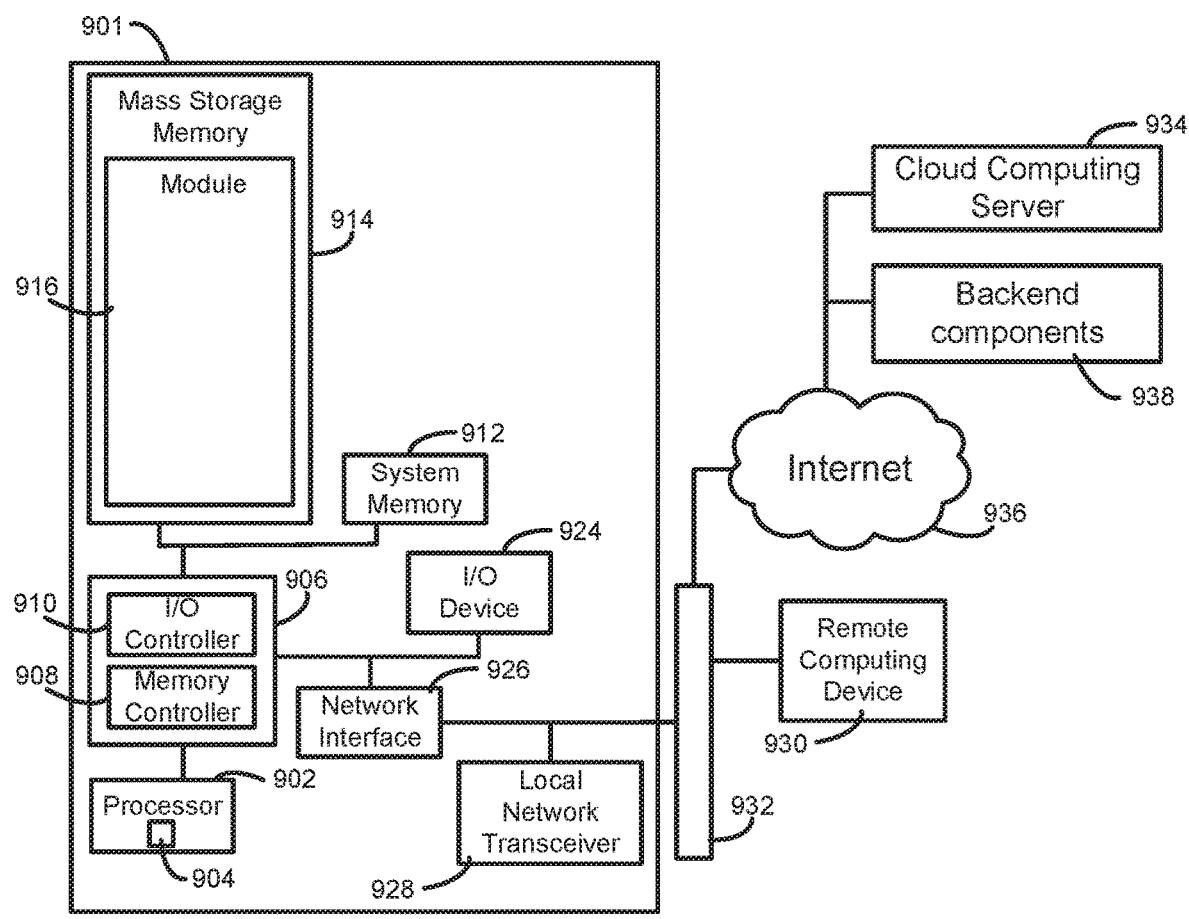
FIG. 6 shows an exemplary computing device that may be physically configured to execute the methods and include the various components described herein.

FIG. 6 is a high-level block diagram of an example computing environment 900 for the system 100 and methods (e.g., method 200) as described herein. The computing device 900 may include a server, a mobile computing device, a cellular phone, a tablet computer, a Wi-Fi-enabled device or other personal computing device capable of wireless or wired communication, a thin client, or other known type of computing device (e.g., the developer computer system 102). Logically, the computing device 900 may be designed and built to specifically execute certain tasks.

As will be recognized by one skilled in the art, in light of the disclosure and teachings herein, other types of computing devices can be used that have different architectures. Processor systems similar or identical to the example systems and methods described herein may be used to implement and execute the example systems and methods described herein. Although the example system 900 is described below as including a plurality of peripherals, interfaces, chips, memories, etc., one or more of those elements may be omitted from other example processor systems used to implement and execute the example systems and methods. Also, other components may be added.

As shown in FIG. 6, the computing device 901 includes a processor 902 that is coupled to an interconnection bus. The processor 902 includes a register set or register space 904, which is depicted in FIG. 6 as being entirely on-chip, but which could alternatively be located entirely or partially off-chip and directly coupled to the processor 902 via dedicated electrical connections and/or via the interconnection bus. The processor 902 may be any suitable processor, processing unit or microprocessor. Although not shown in FIG. 6, the computing device 901 may be a multi-processor device and, thus, may include one or more additional processors that are identical or similar to the processor 902 and that are communicatively coupled to the interconnection bus.

The processor 902 of FIG. 6 is coupled to a chipset 906, which includes a memory controller 908 and a peripheral input/output (I/O) controller 910. As is well known, a chipset typically provides I/O and memory management functions as well as a plurality of general purpose and/or special purpose registers, timers, etc. that are accessible or used by one or more processors coupled to the chipset 906. The memory controller 908 performs functions that enable the processor 902 (or processors if there are multiple processors) to access a system memory 912 and a mass storage memory 914, that may include either or both of an in-memory cache (e.g., a cache within the memory 912) or an on-disk cache (e.g., a cache within the mass storage memory 914).

The system memory 912 may include any desired type of volatile and/or non-volatile memory such as, for example, static random access memory (SRAM), dynamic random access memory (DRAM), flash memory, read-only memory (ROM), etc. The mass storage memory 914 may include any desired type of mass storage device. For example, the computing device 901 may be used to implement a module 916 (e.g., the various modules as herein described). The mass storage memory 914 may include a hard disk drive, an optical drive, a tape storage device, a solid-state memory (e.g., a flash memory, a RAM memory, etc.), a magnetic memory (e.g., a hard drive), or any other memory suitable for mass storage. As used herein, the terms module, block, function, operation, procedure, routine, step, and method refer to tangible computer program logic or tangible computer executable instructions that provide the specified functionality to the computing device 901, the systems and methods described herein. Thus, a module, block, function, operation, procedure, routine, step, and method can be implemented in hardware, firmware, and/or software. In one embodiment, program modules and routines are stored in mass storage memory 914, loaded into system memory 912, and executed by a processor 902 or can be provided from computer program products that are stored in tangible computer-readable storage mediums (e.g. RAM, hard disk, optical/magnetic media, etc.).

The peripheral I/O controller 910 performs functions that enable the processor 902 to communicate with a peripheral input/output (I/O) device 924, a network interface 926, a local network transceiver 928, (via the network interface 926) via a peripheral I/O bus. The I/O device 924 may be any desired type of I/O device such as, for example, a keyboard, a display (e.g., a liquid crystal display (LCD), a cathode ray tube (CRT) display, etc.), a navigation device (e.g., a mouse, a trackball, a capacitive touch pad, a joystick, etc.), etc. The I/O device 924 may be used with the module 916, etc., to receive data from the transceiver 928, send the data to the components of the system 100, and perform any operations related to the methods as described herein. The local network transceiver 928 may include support for a Wi-Fi network, Bluetooth, Infrared, cellular, or other wireless data transmission protocols. In other embodiments, one element may simultaneously support each of the various wireless protocols employed by the computing device 901. For example, a software-defined radio may be able to support multiple protocols via downloadable instructions. In operation, the computing device 901 may be able to periodically poll for visible wireless network transmitters (both cellular and local network) on a periodic basis. Such polling may be possible even while normal wireless traffic is being supported on the computing device 901. The network interface 926 may be, for example, an Ethernet device, an asynchronous transfer mode (ATM) device, an 802.11 wireless interface device, a DSL modem, a cable modem, a cellular modem, etc., that enables the system 100 to communicate with another computer system having at least the elements described in relation to the system 100.

While the memory controller 908 and the I/O controller 910 are depicted in FIG. 6 as separate functional blocks within the chipset 906, the functions performed by these blocks may be integrated within a single integrated circuit or may be implemented using two or more separate integrated circuits. The computing environment 900 may also implement the module 916 on a remote computing device 930. The remote computing device 930 may communicate with the computing device 901 over an Ethernet link 932. In some embodiments, the module 916 may be retrieved by the computing device 901 from a cloud computing server 934 via the Internet 936. When using the cloud computing server 934, the retrieved module 916 may be programmatically linked with the computing device 901. The module 916 may be a collection of various software platforms including artificial intelligence software and document creation software or may also be a Java® applet executing within a Java® Virtual Machine (JVM) environment resident in the computing device 901 or the remote computing device 930. The module 916 may also be a "plug-in" adapted to execute in a web-browser located on the computing devices 901 and 930. In some embodiments, the module 916 may communicate with back end components 938 via the Internet 936.

The system 900 may include but is not limited to any combination of a LAN, a MAN, a WAN, a mobile, a wired or wireless network, a private network, or a virtual private network. Moreover, while only one remote computing device 930 is illustrated in FIG. 6 to simplify and clarify the description, it is understood that any number of client computers are supported and can be in communication within the system 900.

Additionally, certain embodiments are described herein as including logic or a number of components, modules, or mechanisms. Modules may constitute either software modules (e.g., code or instructions embodied on a machine-readable medium or in a transmission signal, wherein the code is executed by a processor) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "an embodiment" or "teaching" means that a particular element, feature, structure, or characteristic described in connection with the embodiment is included in at least one embodiment. The appearances of the phrase "in some embodiments" or "teachings" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Further, the figures depict preferred embodiments for purposes of illustration only. One skilled in the art will readily recognize from the following discussion that alternative embodiments of the structures and methods illustrated herein may be employed without departing from the principles described herein Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

The invention claimed is:

1. A processor-implemented method for creating a merged specification file for a software application, the method comprising:
    receiving a plurality of application programming interface (API) specifications, each API specification including one or more resources and definitions;
    identifying each of the one or more resources and definitions of the plurality of API specifications as either an API resource or an API definition;
    receiving a code file corresponding to the software application, the code file including references to at least one of the one or more resources and definitions;
    initializing a specification document for the software application;
    resolving each of the references of the code file to the respective API resource or API definition of the API specifications; and
    adding the respective API resource or API definition of the API specifications to the specification document;
    wherein the API resource includes an object and at least one uniform resource identifier and the API definition includes a logical entity that defines how the API definition links to other APIs and expected results in a machine-readable format.

2. The method of claim 1, further comprising validating the specification document.

3. The method of claim 1, further comprising storing each API specification within one of an external source directory or an internal source directory.

4. The method of claim 1, further comprising grouping related API resources and API definitions, if any, within a common resources and definitions document.

5. The method of claim 1, wherein at least one of the references includes one or more of an internal definitions reference and an external definitions reference.

6. The method of claim 5, wherein the internal definitions reference includes a file name for the specification document, a reference portion, and an internal definitions pointer portion to specify respective one or more definitions of the API specifications added to the specification document.

7. The method of claim 5, wherein the external definitions reference includes a reference portion and an external definitions pointer portion to specify the respective one or more definitions of the API specifications added to the specification document.

8. The method of claim 1, wherein at least one of the references includes one or more of an internal resources reference and an external resources reference.

9. The method of claim 8, wherein the internal resources reference includes a reference portion and an internal resources pointer portion to specify the respective one or more resources of the API specifications added to the specification document.

10. The method of claim 8, wherein the external resources reference includes a reference portion and an external resources pointer portion to specify the respective one or more resources of the API specifications added to the specification document.

11. A system for creating a merged specification file for a software application, the system comprising:
a processor and memory hosting an application development system; and
a database coupled to the processor and the memory, the database storing a plurality of application programming interface (API) specifications, each API specification including one or more resources and definitions, and a code file corresponding to the software application, the code file including references to at least one of the one or more resources and definitions;
wherein the memory includes instructions that are executable by the processor for:
identifying each of the one or more resources and definitions of the plurality of API specifications as either an API resource or an API definition;
initializing a specification document for the software application;
resolving each of the references of the code file to the respective API resource or API definition of the API specifications; and
adding the respective API resource or API definition of the API specifications to the specification document;
wherein the API resource includes an object and at least one uniform resource identifier and the API definition includes a logical entity that defines how the API definition links to other APIs and expected results in a machine-readable format.

12. The system of claim 11, further comprising instructions for validating the specification document.

13. The system of claim 11, further comprising instructions for storing each API specification within one of an external source directory or an internal source directory.

14. The system of claim 11, further comprising instructions for grouping related API resources and API definitions, if any, within a common resources and definitions document.

15. The system of claim 11, wherein at least one of the references includes one or more of an internal definitions reference and an external definitions reference.

16. The system of claim 15, wherein the internal definitions reference includes a file name for the specification document, a reference portion, and an internal definitions pointer portion to specify respective one or more definitions of the API specifications added to the specification document.

17. The system of claim 15, wherein the external definitions reference includes a reference portion and an external definitions pointer portion to specify the respective one or more definitions of the API specifications added to the specification document.

18. The system of claim 11, wherein at least one of the references includes one or more of an internal resources reference and an external resources reference, wherein the internal resources reference includes a reference portion and an internal resources pointer portion to specify the respective one or more resources of the API specifications added to the specification document, and the external resources reference includes a reference portion and an external resources pointer portion to specify the respective one or more resources of the API specifications added to the specification document.

* * * * *

UNITED STATES PATENT AND TRADEMARK OFFICE
CERTIFICATE OF CORRECTION

PATENT NO. : 10,901,729 B2  
APPLICATION NO. : 16/359702  
DATED : January 26, 2021  
INVENTOR(S) : Singh et al.

Page 1 of 1

It is certified that error appears in the above-identified patent and that said Letters Patent is hereby corrected as shown below:

On the Title Page

Column 1, item (71) Applicants: please delete "Richa Singh, Bellevue, WA (US); Elsi Godolja, Bellevue, WA (US); Anurag Gupta, Bellevue, WA (US); Sebastian Amara, Bellevue, WA (US)" and insert --VISA INTERNATIONAL SERVICE ASSOCIATION, San Francisco, CA (US)-- therefor.

Signed and Sealed this  
Eighth Day of March, 2022

Drew Hirshfeld  
*Performing the Functions and Duties of the*  
*Under Secretary of Commerce for Intellectual Property and*  
*Director of the United States Patent and Trademark Office*